United States Patent
Notari et al.

(10) Patent No.: US 11,979,056 B2
(45) Date of Patent: May 7, 2024

(54) POWER SUPPLY SYSTEM, AND UNINTERRUPTIBLE POWER SUPPLY INCLUDING A POWER SUPPLY SYSTEM

(71) Applicant: ABB Schweiz AG, Baden (CH)

(72) Inventors: Nicola Notari, Gentilino (CH); Gianluca Butti, Quartino (CH); Mattia Stacchi, Claro (CH)

(73) Assignee: ABB Schweiz AG, Baden (CH)

( * ) Notice: Subject to any disclaimer, the term of this patent is extended or adjusted under 35 U.S.C. 154(b) by 133 days.

(21) Appl. No.: 17/588,874

(22) Filed: Jan. 31, 2022

(65) Prior Publication Data
US 2022/0158483 A1     May 19, 2022

Related U.S. Application Data

(63) Continuation of application No. PCT/EP2020/071713, filed on Jul. 31, 2020.

(30) Foreign Application Priority Data

Jul. 31, 2019 (EP) .................................. 19189441

(51) Int. Cl.
    *H02J 9/06*       (2006.01)
    *H02J 5/00*       (2016.01)

(52) U.S. Cl.
    CPC ............... *H02J 9/062* (2013.01); *H02J 5/00* (2013.01); *H02J 9/068* (2020.01)

(58) Field of Classification Search
    CPC ............... H02J 9/062; H02J 9/068; H02J 5/00
(Continued)

(56) References Cited

U.S. PATENT DOCUMENTS 4,115,704 A *   9/1978   Hannemann ............ H02J 9/062
                                                              307/64
5,264,732 A *   11/1993   Fiorina ................... H02J 9/062
                                                               307/64

(Continued)

FOREIGN PATENT DOCUMENTS

| CN | 106169804 A | 11/2016 |
| EP | 2654176 A1 | 10/2013 |

OTHER PUBLICATIONS

European Patent Office, Extended European Search Report in European Patent Application No. 19189441.9, 8 pp. (dated Dec. 19, 2020).

(Continued)

*Primary Examiner* — Alfonso Perez Borroto
(74) *Attorney, Agent, or Firm* — Leydig, Voit & Mayer, Ltd.

(57) ABSTRACT

A power supply system comprises an AC input, an AC output, and a DC input; a DC intermediate circuit; a first converter connected, via a first bistable switching circuit, between the AC input and the DC intermediate circuit; a second converter connected, via a second bistable switching circuit, between the DC intermediate circuit and the AC output; a third converter connected, via a third bistable switching circuit, between the DC input and the DC intermediate circuit; a bypass circuit connected, via a bypass bistable switching circuit, between the AC input and the AC output and configured to provide a bypassing path from the AC input to the AC output; and a control unit.

13 Claims, 1 Drawing Sheet

(58) Field of Classification Search
USPC .......................................................... 307/82
See application file for complete search history.

(56) References Cited

U.S. PATENT DOCUMENTS

| | | | | |
|---|---|---|---|---|
| 6,801,019 | B2 * | 10/2004 | Haydock | .................. H02P 9/04 |
| | | | | 322/17 |
| 7,573,145 | B2 * | 8/2009 | Peterson | ................. F02D 29/06 |
| | | | | 290/40 C |
| 7,855,466 | B2 * | 12/2010 | Bax | .......................... H02J 7/02 |
| | | | | 290/40 C |
| 9,118,213 | B2 * | 8/2015 | Koehl | ..................... H02J 3/388 |
| 2005/0036253 | A1 | 2/2005 | Tian et al. | |
| 2008/0204964 | A1 | 8/2008 | Huang | |
| 2012/0013193 | A1 | 1/2012 | Sato et al. | |

OTHER PUBLICATIONS

European Patent Office, International Preliminary Report on Patentability in International Patent Application No. PCT/EP2020/071713, 23 pp. (dated Oct. 22, 2021).
European Patent Office, International Search Report in International Patent Application No. PCT/EP2020/071713, 6 pp. (dated Oct. 1, 2020).
European Patent Office, Written Opinion in International Patent Application No. PCT/EP2020/071713, 9 pp. (dated Oct. 1, 2020).
European Patent Office, Written Opinion in International Patent Application No. PCT/EP2020/071713, 7 pp. (dated Jun. 7, 2021).

* cited by examiner

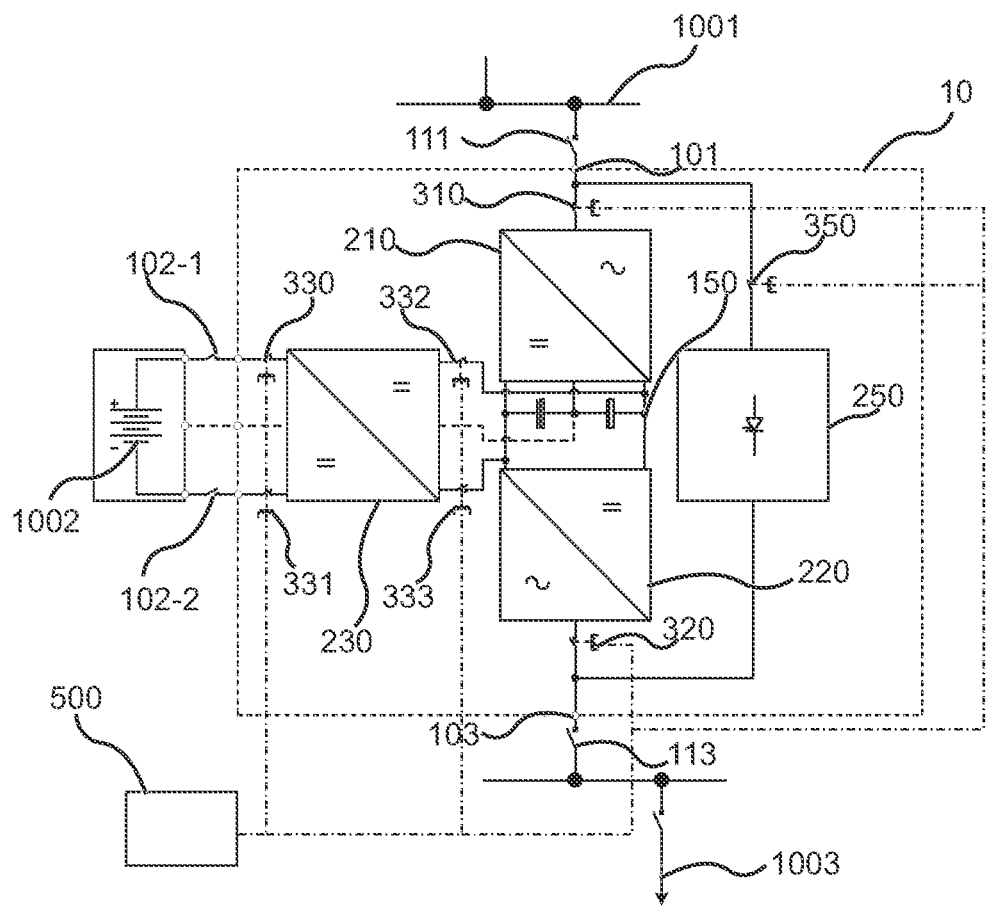

POWER SUPPLY SYSTEM, AND UNINTERRUPTIBLE POWER SUPPLY INCLUDING A POWER SUPPLY SYSTEM

CROSS-REFERENCE TO RELATED APPLICATIONS

This patent application is a continuation of International Patent Application Ser. No. PCT/EP2020/071713, filed on Jul. 31, 2020, which claims priority to European Patent Application No. 19189441.9, filed on Jul. 31, 2019, both of which are incorporated herein by reference.

FIELD OF THE DISCLOSURE

The instant disclosure relates to a power supply system and, more particularly, to an uninterruptible power supply that includes a power supply system.

BACKGROUND OF THE INVENTION

A power supply system having multiple converters, e.g. AC/DC converters, DC/DC converters, and DC/AC converters, can often be found in uninterruptible power supplies (UPS). In a typical UPS configuration, a load—e.g. an information processing system such as a computer—is not directly connected to a grid-connected AC power line, but rather through intermediation of a power supply system that selectively supplies energy either from the grid AC power line, or—in the case of power shortage, power outage or the like on the grid—from a backup energy source. Typically, a battery is used as the backup energy source.

Conventional power supply systems are known in which a DC intermediate circuit, or DC link, is used for central distribution of the various sources of input power to an output converter (a DC/AC converter). The load is connected to an output of the output converter. The DC intermediate circuit is supplied with input power via appropriate input converts. Examples of input converters include an AC/DC converter for supplying input energy from the AC grid side to the DC intermediate circuit, and a DC/DC converter for supplying input energy from a DC backup energy source (typically, a battery or a stack of batteries) to the DC intermediate circuit at an appropriate voltage level.

Conventionally, electromechanical breakers (e.g., contactors, standard relays, motor driven-switch dis-connectors or the like) are used to disconnect and isolate the different converters from AC or DC power sources and loads. Contactors and standard relays require a holding current to maintain at least one of their positions; accordingly, dedicated holding circuits or locking circuits have to be provided, and power consumption increases. A motor driven-switch dis-connector suffers from having comparatively slow switching times or transition times.

Hence, there is a desire for a power supply system that has a comparatively low power consumption and/or allows for comparatively fast switching or transition times.

BRIEF SUMMARY OF THE INVENTION

In an aspect of the present disclosure, a power supply system is provided. The power supply system comprises an AC input, an AC output, and a DC input. The power supply system further comprises a DC intermediate circuit, a first converter, a second converter, a third converter, a bypass circuit, and a control unit.

BRIEF DESCRIPTION OF THE SEVERAL VIEWS OF THE DRAWING(S)

In the following, embodiments of the present disclosure will be described with reference to the single drawing.

FIG. 1 is a circuit diagram of a power supply system according to an embodiment of the present disclosure.

DETAILED DESCRIPTION OF THE INVENTION

FIG. 1 shows a circuit diagram of an arrangement comprising a power supply system 10 according to an embodiment. An AC input 101 is connected, via a switch 111 such as a manual switch or a controllable switch, to an AC grid 1001. An AC output is connected, via a switch 113 such as a manual switch, to an AC load 1003. Two different polarity sides 102-1, 102-2 form a DC input. In the present embodiment, externally connected to the DC input 102-1, 102-2 is a battery 1002, but this is by way of example only and not by way of limitation.

A first converter 210 in the present embodiment is an AC/DC converter for converting power received from the AC input 101 into DC power, and feeding this resultant DC power to a DC intermediate circuit 150, or DC link. Typically, the first converter 210 is a boost converter. A second converter 220 in the present embodiment is a DC/AC converter for converting power received from the DC intermediate circuit 150 into AC power, and feeding this resultant AC power to the AC output 103. A third converter 230 in the present embodiment is a DC/DC converter for converting power received from the DC input 102-1, 102-2 into DC power suitable for the DC intermediate circuit 150, and feeding this resultant DC power to the DC intermediate circuit 150.

The first converter 210 is connected between the AC input 101 and the DC intermediate circuit 150 via a first bistable switching circuit 310. In the present embodiment, the first bistable switching circuit 310 is located between the AC input and an input side of the first converter 210; however, the first bistable switching circuit 310 may also be located between an output side of the first converter 210 and the DC intermediate circuit.

The second converter 220 is connected between the DC intermediate circuit 150 and the AC output 103 via a second bistable switching circuit 320. In the present embodiment, the second bistable switching circuit 320 is located between an output side of the second converter 220 and the AC output 103; however, the second bistable switching circuit 320 may also be located between an input side of the second converter 220 and the DC intermediate circuit 150.

The third converter 230 is connected between the DC-input 102-1, 102-2 and the DC intermediate circuit 150 via a third bistable switching circuit 330, 331.

A bypass circuit 250 is connected between the AC input 101 and the AC output 103. The bypass circuit selectively, or controllably, provides a bypassing path from the AC input 101 to the AC output 103. The connection of the bypass circuit 250 between the AC input 101 and the AC output 103 is via a bypass bistable switching circuit 350.

All of the bistable switching circuits 310, 320, 330, 331 350 are controllable via a control unit 500. The control unit controls an operation mode that is selectable out of a plurality of operation modes. In each operation mode, at least one of the bistable switching circuits 310, 320, 330, 331 350 is controlled such that it is in a galvanically isolated state.

In the present embodiment, the bistable switching circuits 310, 320, 330, 331, 350 operate free of a holding current. As such, the bistable switching circuits 310, 320, 330, 331, 350 of the present embodiment are or comprise bistable relays as switching elements; however, one or more of the bistable switching circuits 310, 320, 330, 331, 350 may also be or include a bistable contactor (not shown), a monostable relay operated by a bistable emulation mode circuit (not shown), a monostable contactor operated by bistable emulation mode circuit (not shown), or a semiconductor switch operated by a bistable emulation mode circuit (not shown). Furthermore, the configuration is not limited to one switching element per bistable switching circuits 310, 320, 330, 331, 350, and multiple switching elements may, e.g., be connected in parallel.

The control unit 500 is configured to toggle, particularly to switch from a first state into a second state, each of the bistable switching circuits 310, 320, 330, 331, 350 as demanded by the respective operation mode. In the present embodiment, and without limitation, the control unit supplies one or more monopolar DC switch pulses to the respective one or more of the bistable switching circuits 310, 320, 330, 331, 350 to be toggled, particularly switched; the polarity of the switch pulse is selected in accordance with the desired target state of the respective bistable switching circuit 310, 320, 330, 331, 350 in harmony with the selected operation mode.

The operation mode comprises the following:

In a bypass circuit connection mode, the bypass bistable switching circuit 350 is in an electrically conductive state, thereby connecting the bypass circuit 250 to the AC input 101 and the AC output 103. In a bypass circuit isolation mode, the bypass bistable switching circuit 350 is in the galvanically isolated state or open state, thereby isolating the bypass circuit 250 from the AC input 101 and/or the AC output 103. In this way, the grid voltage, via the AC input 101, can directly be connected to the load 1003 at the AC output 103 in the case that the grid is operating normally.

The operation mode may further comprise one or more of the following:

In a bypass circuit defect system state, the bypass circuit is deemed to be defective (e.g., malfunctioning). In the bypass circuit defect system state, a bypass circuit isolation mode is selected in which the bypass bistable switching circuit 350 is operated to be in the galvanically isolated state.

In a grid absence state, AC power is deemed to be absent, i.e. it is not possible for whatever reason to supply AC power from the grid to the AC input 101. In the grid absence state, a bypass circuit and main grid isolation mode is selected in which the bypass bistable switching circuit 350 is operated to be in the galvanically isolated state and wherein the first bistable switching circuit 310 is operated to be in the galvanically isolated state.

In a battery disconnect state, the battery 1002 is deemed to be disconnected or not delivering any power to the DC input 102-1, 102-2. In the battery disconnect state, a battery isolation mode is selected wherein the third bistable switching circuit 330, 331 is operated to be in the galvanically isolated state.

In a stand-by or maintenance state, the system 100 is in stand-by operation, or a maintenance operation is to be performed on the system 100. In the stand-by or maintenance state, an AC output isolation mode is selected in which the second bistable switching circuit 320 is operated to be in the galvanically isolated state.

In a system-off state, the system is turned off, i.e. (temporarily) out of order. In the system-off state, a battery and AC output isolation mode is selected wherein the second bistable switching circuit 320 is operated to be in the galvanically isolated state and wherein the third bistable switching circuit 330, 331 is operated to be in the galvanically isolated state.

According to the present embodiment, one or more of the bistable switching circuits 310, 320, 330, 331, 350 comprise a driving circuit (not shown) that is configured to detect an emergency state. An emergency state may e.g. comprise a short-circuit state, an overvoltage or an overcurrent state, a grid absence state and the like. When the driver circuit detects the emergency state, is toggles the corresponding switching circuit 310, 320, 330, 331, 350 into the galvanically isolated state. In this way, a secure operation may be performed as with monostable relays or contactors, while at the same time a holding current need not be supplied.

It is noted that while the above description refers to specific embodiments, the skilled person will recognize that the features described therein may be combined as appropriate, and/or that one or more features thereof may be altered or omitted as appropriate, without departing from the gist of the present application whose scope is defined by the claims.

In a general aspect, the present disclosure describes a power supply system having an AC input, an AC output, and a DC input. The power supply system further comprises a DC intermediate circuit, a first converter, a second converter, a third converter, a bypass circuit, and a control unit.

The first converter is connected between the AC input and the DC intermediate circuit, via a first bistable switching circuit. The second converter is connected between the DC intermediate circuit and the AC output, via a second bistable switching circuit. The third converter is connected between the DC input and the DC intermediate circuit, via a third bistable switching circuit. The bypass circuit is connected between the AC input and the AC output, via a bypass bistable switching circuit. The bypass circuit is configured to provide a bypassing path from the AC input to the AC output.

The control unit is configured such that it controls an operation mode of the power supply system, such that an operation mode is selected or selectable out of a plurality of modes of the power supply system. In each operation mode of the plurality of operation modes, at least one of the bistable switching circuits is in a galvanically isolated state. Typically, in each operation mode, at least one of the bistable switching circuits is selectively brought into, or controlled to be—i.e. toggled, more particularly switched from a first state into a second state, such that it is—in the galvanically isolated state. It is self-evident that the term "each of the operation mode of the power supply system" refers, exhaustively, to all operation mode of the power supply system, and that there are no further operation mode of the power supply system than these.

The DC intermediate circuit, or DC link, is typically a voltage DC link or a current DC link. Typically, the DC intermediate circuit provides a midpoint reference potential, or internal reference potential of the power supply system.

Any one or all of the first converter, the second converter, and the third converter may each be converter assemblies of multiple converters or converter stages.

The expression according to which a unit is connected between one element and another element, as used herein, typically refers to a connection of an input side of the unit to the one element, and an output side of the unit to the other element. For example, the first converter being connected between the AC input and the DC intermediate circuit typically means that an input side of the first converter is connected to the AC input, and that an output side of the first converter is connected to the DC intermediate circuit.

The expression according to which a connection of a unit is via a certain element, as used herein, typically refers to a connection in which the element is intermediated into the connection. For example, the first converter being connected between the AC input and the DC intermediate circuit via the first bistable switching circuit typically means one of the following: Either an input side of the first converter is connected to one side of the first bistable switching circuit, another side of the first bistable switching circuit is connected to the AC input, and an output side of the first converter is connected to the DC intermediate circuit; or an input side of the first converter is connected to the AC input, and an output side of the first converter is connected to one side of the first bistable switching circuit, and another side of the first bistable switching circuit is connected to the DC intermediate circuit.

The AC input is typically connectible to an AC power supply line, such as an AC grid. The AC output is typically connectible to an AC load, such as a device to be supplied with power from the DC intermediate circuit, which in turn is selectively supplied with power from the AC input, from the DC input, or both.

In embodiments, the operation mode comprises at least a bypass circuit connection mode in which the bypass bistable switching circuit is in an electrically conductive state, and a bypass circuit isolation mode in which the bypass bistable switching circuit is in the galvanically isolated state. As used herein, in the electrically conductive state, the bypass circuit is connected to the AC input and the AC output. Likewise, as used herein, in the open state, the bypass circuit is isolated from the AC input or from the AC output, or isolated both from the AC input and from the AC output.

In embodiments, the control unit is further configured to detect a system state. According to this embodiment, the control unit is further configured to select an operation mode according to the detected system state. The system state comprises one or more of a bypass circuit defect system state, a grid absence state and a battery disconnect state. In addition, the system state may comprise one or more of a stand-by or maintenance state and a system-off state.

In the embodiment, in the bypass circuit defect system, a bypass circuit isolation mode is selected wherein the bypass bistable switching circuit is operated to be in the galvanically isolated state. In the embodiment, in the grid absence state, a bypass circuit and main grid isolation mode is selected wherein the bypass bistable switching circuit is operated to be in the galvanically isolated state and wherein the first bistable switching circuit is operated to be in the galvanically isolated state. In the embodiment, in the battery disconnect state, a battery isolation mode is selected wherein the third bistable switching circuit is operated to be in the galvanically isolated state. In the embodiment, in the stand-by or maintenance state, an AC output isolation mode is selected wherein the second bistable switching circuit is operated to be in the galvanically isolated state. In the embodiment, in the system-off state, a battery and AC output isolation mode is selected wherein the second bistable switching circuit is operated to be in the galvanically isolated state and wherein the third bistable switching circuit is operated to be in the galvanically isolated state.

In yet further embodiments, one or more of the bistable switching circuits operates free of a holding current. In other words: In certain embodiments, the control unit may control the operation mode, thereby toggling, more particularly switching at least one of the bistable switching circuits to be in the galvanically isolated state and possibly toggling at least another one of the bistable switching circuits to be in the electrically conductive state, without the need to (directly or indirectly) continuously supply a current for maintaining either one of the galvanically isolated state and the electrically conductive state. In yet another way of expression, and without limitation: Latching circuits such as latching relays or latching contactors may be used instead of standard relays or contactors, in one or more of the first, second, third, or bypass bistable switching circuits.

In yet further embodiments, one or more of the bistable switching circuits comprise one or more switching elements selected from the group consisting of: bistable relay, bistable contactor, monostable relay operated by bistable emulation mode circuit, monostable contactor operated by bistable emulation mode circuit, semiconductor switch operated by bistable emulation mode circuit. In this connection, typically, one dedicated bistable emulation mode circuit is disposed in the vicinity of the monostable element that controls. A bistable emulation mode circuit, as used herein, typically provides the corresponding conventional monostable element (relay, contactor), with a toggling functionality. Although a holding current has to be supplied by the bistable emulation mode circuit to such a monostable element in order to maintain one of the states (typically, the conducting state), the holding current generation and supply is shifted from the control unit to a location in the vicinity of the respective monostable element. Thus, it is possible to mix monostable elements plus the corresponding bistable emulation circuits and bistable elements in one configuration. Furthermore, the length of the holding current supply lines is shortened.

In yet further embodiments, one or more of the bistable switching circuits comprise one or more switching elements connected in parallel. In this way, the current carry capacity in the branch can be increased.

In yet further embodiments, the control unit is configured to control any one of the bistable switching circuits by supplying one or more switch pulses. The switch pulses may be DC switch pulses. Typically, the switch pulse is limited in duration, such as, without limitation, 10 ms to 100 ms. The switch pulse may have a polarity corresponding to the desired state of the respective bistable switching circuit, i.e. galvanically isolated state or conducting state. In this connection, the control unit may supply a plurality of DC switch pulses of a same polarity to any one of the bistable switching circuits to be controlled. In this way, a transition of the state may be ensured.

In the aforementioned embodiment, in controlling any one of the bistable switching circuits into a desired state, the control unit may be configured to supply a switch pulse to the respective bistable switching circuit, determine whether the respective bistable switching circuit has established the desired state, and, if the desired state was not established, supply another switch pulse to the respective bistable switching circuit. Typically, the control unit may be configured to supply a plurality of switch pulses pulse to the respective bistable switching circuit, determine whether the respective bistable switching circuit has established the desired state, and, if the desired state was not established, supply another plurality of switch pulses to the respective bistable switching circuit.

In yet further embodiments, one or more of the bistable switching circuits comprises a driving circuit. The driving circuit is configured to detect an emergency state and, when the emergency state is detected, to toggle, particularly to switch, the corresponding bistable switching circuit into the galvanically isolated state. The emergency state may comprise one or more of the following: A malfunction of the control unit, a maloperation of the control unit, a predetermined voltage characteristic of the AC input. Particularly, the predetermined voltage characteristic of the AC input may comprise a dropping of an AC input voltage (e.g., an AC grid voltage) below a predetermined threshold value for a predetermined amount of time.

In yet further embodiments, the control unit comprises a processor device. The control unit is configured to keep a respective state (e.g., electrically conductive state or galvanically isolated state) of one or more of the bistable switching circuits during an initialization process of the processor device. Particularly, the control unit is configured to keep the respective state of all bistable switching circuits during the initialization process of the processor device. In this way, a restarting operation (an initialization process) of the processor device does not lead to any unpredictable state of the bistable switching circuits. Thus, the control unit (e.g., a DSP or a microcontroller) may reboot, and the bistable relays or the like that are used in the bistable switching circuits remain stable on their previous status, without any unpredicted transition.

In the aforementioned embodiment, the control unit can be configured to determine the state of the one or more bistable switching circuits without performing a switching operation, particularly without causing the bistable switching circuits to exit the previous state.

In yet further embodiments, the control unit can comprise a memory to retain, keep or store the state of one or more of the bistable switching circuits. The memory is preferably configured to retain the stored states under all conditions of the control unit, particularly under conditions in which the control unit is unpowered, resetting, rebooting, powering up, powering down, being maintained, being reprogrammed, being in a sleep or hibernation mode or any other condition. The memory can be non-volatile. The memory can comprise a separate power source, such as a battery. The memory can be configured to be accessed by the control unit to retrieve the stored state of one or more of the bistable switching circuits. The memory can be configured to be accessed by the control unit to store the state of one or more of the bistable switching circuits. The states can be stored in predefined or random intervals. The states can be stored when the state of one or more of the bistable switching circuits changes. In a preferred embodiment, the states stored in the memory at substantially all times correspond to the state of the one or more bistable switching circuits. Having access to the stored state of the one or more bistable switching circuits can allow the control unit to establish the current state of the power supply system without performing any active operations on the one or more bistable switching circuits such as switching or determining their states.

According to a further aspect of the present disclosure, an uninterruptible power supply comprises the power supply system as described herein.

With the presently described configuration, e.g. latching elements may be employed instead of monostable elements. Latching relays, for example, allow for efficiency optimization and the market available choice of devices make them attractive on a cost vs. current rating basis. As the latching relay maintains its contact position after the control power has been removed, a power saving is achievable. Furthermore, latching relays as opposed to contactors, offer the possibility to be mounted directly on PCBA improving power density and allow to decrease system complexity.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power supply system, comprising:
    an AC input, an AC output, and a DC input;
    a DC intermediate circuit/a DC link;
    a first converter connected, via a first bistable switching circuit, between the AC input and the DC intermediate circuit;
    a second converter connected, via a second bistable switching circuit, between the DC intermediate circuit and the AC output;
    a third converter connected, via a third bistable switching circuit, between the DC input and the DC intermediate circuit;
    a bypass circuit connected, via a bypass bistable switching circuit, between the AC input and the AC output and configured to provide a bypassing path from the AC input to the AC output; and
    a control unit configured to control an operation mode out of a plurality of operation modes of the power supply system, wherein in each operation mode of the plurality of operation modes, at least one of the bistable switching circuits is in a galvanically isolated state, wherein the operation mode comprises at least:
a bypass circuit connection mode in which the bypass bistable switching circuit is in an electrically conductive state; and
a bypass circuit isolation mode in which the bypass bistable switching circuit is in the galvanically isolated state, wherein the control unit is further configured to detect a system state and to select the operation mode out of the plurality of operation modes according to the detected system state, the system state and the selected operation mode including a bypass circuit defect system state in which state the bypass circuit isolation mode is selected, wherein the bypass bistable switching circuit is operated to be in the galvanically isolated state.

2. The power supply system according to claim 1, wherein the system state and the selected operation mode further including at least one of the following:
a grid absence state, in which state the bypass circuit and main grid isolation mode is selected wherein the bypass bistable switching circuit is operated to be in the galvanically isolated state and wherein the first bistable switching circuit is operated to be in the galvanically isolated state; and
a battery disconnect state, in which state a battery isolation mode is selected wherein the third bistable switching circuit is operated to be in the galvanically isolated state.

3. The power supply system according to claim 2, wherein the system state and the selected operation mode further includes at least one of the following:
a stand-by/maintenance state, in which state an AC output isolation mode is selected wherein the second bistable switching circuit is operated to be in the galvanically isolated state;
a system-off state, in which state a battery and AC output isolation mode is selected wherein the second bistable switching circuit is operated to be in the galvanically isolated state and wherein the third bistable switching circuit is operated to be in the galvanically isolated state.

4. The power supply system according to claim 1, wherein one or more of the bistable switching circuits operates free of a holding current.

5. The power supply system according to claim 1, wherein one or more of the bistable switching circuits comprise one or more switching elements selected from the group consisting of: bistable relay, bistable contactor, monostable relay operated by bistable emulation mode circuit, monostable contactor operated by bistable emulation mode circuit, semiconductor switch operated by bistable emulation mode circuit.

6. The power supply system according to claim 1, wherein one or more of the bistable switching circuits comprise one or more switching elements connected in parallel.

7. The power supply system according to claim 1, wherein the control unit is configured to control any one of the bistable switching circuits by supplying one or more switch pulses, particularly DC switch pulses.

8. The power supply system according to claim 7, wherein the control unit is configured to supply a plurality of DC switch pulses of a same polarity to any one of the bistable switching circuits to be controlled.

9. The power supply system according to claim 7, wherein the control unit, in controlling any one of the bistable switching circuits into a desired state, is configured to supply one or more switch pulses to the respective bistable switching circuit, determine whether the respective bistable switching circuit has established the desired state, and, if the desired state was not established, supply another one or more switch pulses to the respective bistable switching circuit.

10. The power supply system according to claim 1, wherein one or more of the bistable switching circuits comprise a driving circuit, the driving circuit being configured to detect an emergency state and, when the emergency state is detected, to toggle the corresponding switching circuit into the galvanically isolated state.

11. The power supply system according to claim 10, wherein the emergency state comprises one or more of a malfunction of the control unit, a maloperation of the control unit, a predetermined voltage characteristic of the AC input.

12. The power supply system according to claim 1, wherein the control unit comprises a processor device, wherein the control unit is configured to keep a respective state of one or more of the bistable switching circuits during an initialization process of the processor device.

13. An uninterruptible power supply comprising a power supply system, the power supply system, comprising:
an AC input, an AC output, and a DC input;
a DC intermediate circuit/a DC link;
a first converter connected, via a first bistable switching circuit, between the AC input and the DC intermediate circuit;
a second converter connected, via a second bistable switching circuit, between the DC intermediate circuit and the AC output;
a third converter connected, via a third bistable switching circuit, between the DC input and the DC intermediate circuit;
a bypass circuit connected, via a bypass bistable switching circuit, between the AC input and the AC output and configured to provide a bypassing path from the AC input to the AC output; and
a control unit configured to control an operation mode out of a plurality of operation modes of the power supply system, wherein in each operation mode of the plurality of operation modes, at least one of the bistable switching circuits is in a galvanically isolated state, wherein the operation mode comprises at least:
a bypass circuit connection mode in which the bypass bistable switching circuit is in an electrically conductive state; and
a bypass circuit isolation mode in which the bypass bistable switching circuit is in the galvanically isolated state, wherein the control unit is further configured to detect a system state and to select the operation mode out of the plurality of operation modes according to the detected system state, the system state and the selected operation mode including a bypass circuit defect system state, in which state the bypass circuit location isolation mode is selected, wherein the bypass bistable switching circuit is operated to be in the galvanically isolated state.

* * * * *